Feb. 9, 1926.
H. VANDERBEEK
ROLLER BEARING
Filed July 9, 1924
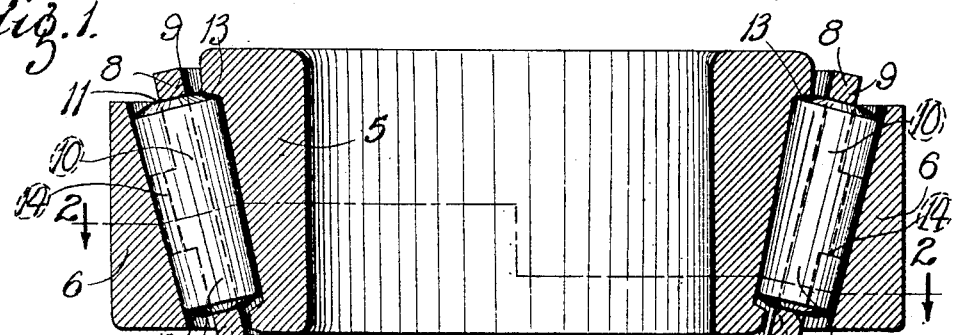
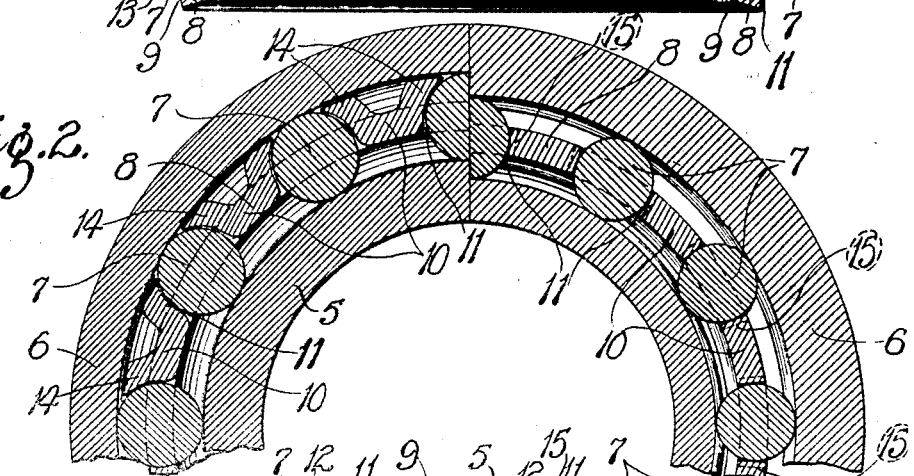
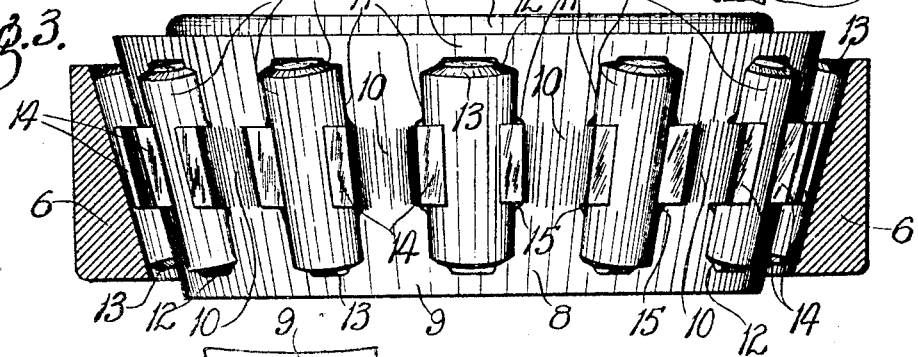
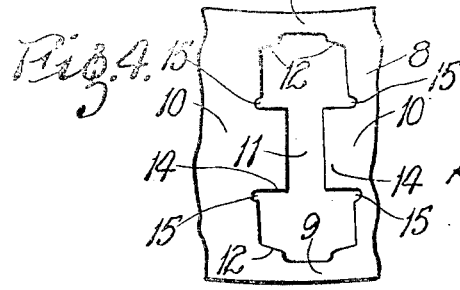
INVENTOR:
Herbert Vanderbeek,
by Cann & Cann
HIS ATTORNEYS.

Patented Feb. 9, 1926.

1,572,453

UNITED STATES PATENT OFFICE.

HERBERT VANDERBEEK, OF CANTON, OHIO, ASSIGNOR TO THE TIMKEN ROLLER BEARING COMPANY, OF CANTON, OHIO, A CORPORATION OF OHIO.

ROLLER BEARING.

Application filed July 9, 1924. Serial No. 724,961.

*To all whom it may concern:*

Be it known that I, HERBERT VANDERBEEK, a citizen of the United States, and a resident of the city of Canton, in the county of Stark and State of Ohio, have invented a certain new and useful Improvement in Roller Bearings, of which the following is a specification.

My invention relates to roller bearings and particularly to the cage for the rollers thereof. According to present practice, cages for roller bearings are commonly made of sheet metal blanks which are submitted to appropriate operations to perforate and shape them suitably for their purpose, so that the product comprises annular end members integrally connected by bridges spaced apart to form the pockets for the rollers. With certain types of roller bearings that use cages of this kind, common practice requires the bridges to be bent or sprung prior to or during the assembling of the members of the bearing; and this practice involves more or less risk of permanently distorting the cage or of disturbing the proper fit of the bridges with reference to the rollers. One of the principal objects of the present invention is to obviate this disadvantage; and other objects are to minimize friction and to assure the proper alinement of the rollers. The invention consists in the construction and arrangement of parts hereinafter described and claimed.

In the accompanying drawing, wherein like numerals refer to like parts wherever they occur, Fig. 1 is an end elevation of a roller bearing embodying my invention;

Fig. 2 is a transverse section through the bearing on the line 2—2 in Fig. 1;

Fig. 3 is a side view of the bearing, the outer bearing member being shown in section; and Fig. 4 is a face view of a portion of the cage blank after the pocket has been punched therein and before the flaps are struck up.

My bearing comprises a cone or inner raceway 5, a cup or outer raceway 6, a series of rollers 7 intervening between said raceways, and a cage 8 for said rollers. In the construction illustrated, all of these members are of conical form although the invention is also applicable to members of cylindrical form.

The cage 8 consists of a one-piece shell having continuous annular end members 9 integrally connected by bridges 10 that are spaced apart to form the pockets 11 for the rollers 7. The pockets are approximately of the same length as the rollers; and in the construction illustrated, the ends of the pockets are inclined or chamfered, as at 12, to conform to the beveled edges 13 of the rollers and limit the contact of the ends of the rollers to said beveled edges, leaving the central portion of said ends clear of the cage. The distance between the end portions of the bridges 10, that is to say, the width of the end portions of the pockets 11, is approximately the same as the width of the end portions of the rollers, but there is sufficient clearance between the bridges and the rollers to permit the rollers to run freely. The middle portions of the bridges 10 have flaps or wings 14 integral therewith, which are struck up, outwardly as illustrated, or inwardly if preferred. The body of the cage 8, including the wings 14 thereof, is substantially in circular alinement with the axes of the rollers, that is, the bridges are located where the space between the adjacent rollers is the least. The advantage of this location is that it minimizes the disadvantages incident to inaccuracies in the diameter of the cage or in the radial position of the bridges, and particularly that it eliminates the necessity for springing or bending the bridges in the act of assembling the members of the bearing.

As stated above, the wings are normally out of contact with the rollers and serve only to prevent their becoming displaced radially when the members are not wholly assembled. Not only are the wings normally clear of the rollers, but the middle portions of the walls of the pockets are also clear by reason of the fact that the wings are struck up from a line further back in the bridge than the line of the edges of the end portions of the pockets. The advantage of this construction is that it reduces the friction, and by limiting the contact to the end portions of the bridges, it makes it easier to obtain an accurate fitting between the bridges and the rollers, and at the same time minimizes the effects of inaccuracies occurring in the middle portions of the bridges.

For the purpose of keeping the middle portions of the bridges clear of the rollers as aforesaid, the bridges are notched slightly next to the ends of the flaps or wings, as shown at 15, so that the bottoms of these notches determine the line along which the wings are struck up. Thus, the shape of the holes in the blank conforms generally to the shape of a longitudinal central section of a roller, except that there is a reentrant portion at the middle of each side, which reentrant portion is separated from the end portions of the hole by recesses or short portions of greater width than the end portions of the hole. The general shape is such as may be called dumbbell shape, and the reason for said shape is explained above.

What I claim is:

1. A roller bearing comprising inner and outer raceways, rollers between said raceways and a cage for said rollers, said cage comprising a shell substantially in circular alinement with the axes of said rollers and having pockets whose width near the ends thereof is approximately the same as the width of the adjacent portions of said rollers, and whose width at and near the middle thereof is sufficient to keep the rollers clear of said middle portion even when the end portions of said rollers contact sidewise with the side edges of the end portions of said pockets.

2. A roller bearing comprising conical inner and outer raceways, conical rollers between said raceways and a cage for said rollers, said cage comprising a conical shell substantially in circular alinement with the axes of said rollers and having pockets whose width near the ends thereof is approximately the same as the width of the adjacent portions of said rollers, and whose width at and near the middle thereof is sufficient to keep the rollers clear of said middle portion even when the end portions of said rollers contact sidewise with the side edges of the end portions of said pockets.

3. A roller bearing comprising conical inner and outer raceways, conical rollers between said raceways and a cage for said rollers, said cage comprising a conical shell substantially in circular alinement with the axes of said rollers and having alternating pockets and bridges connecting the ends thereof, the end portions of said bridges being spaced apart a distance approximately equal to the thickness of the portions of the rollers opposite them, and the middle portion of the bridges being spaced apart a distance appreciably greater than the thickness of the portions of the rollers opposite them and having short flaps that overlap the sides of said rollers and clear said rollers in all positions when the bearing is assembled.

4. A cage for roller bearings comprising a metal shell having a series of dumb-bell shaped holes therein, the reentrant marginal portions of the wall of each hole being struck up along a line inwardly beyond the side edges of the end portions, and the end corners of said holes forming oblique angles with said side edges.

5. A blank for a roller bearing cage comprising a metal shell having a series of holes therein, the end portions of said holes conforming to the rollers to be used with such cage and the middle portion being of narrower width than said end portions and separated therefrom by short portions that are wider than said end portions, whereby portions of the metal opposite said middle portion may be struck up on lines tangent to said short portions to form flaps that will clear such rollers.

Signed at Canton, Ohio, this 3rd day of July 1924.

HERBERT VANDERBEEK.